(12) United States Patent
Maeda (10) Patent No.: US 8,041,149 B2
(45) Date of Patent: Oct. 18, 2011

(54) IMAGE PROCESSING APPARATUS, AND CONTROL METHOD AND PROGRAM OF THE SAME

(75) Inventor: Masao Maeda, Kawasaki (JP)

(73) Assignee: Canon Kabushiki Kaishi, Tokyo (JP)

( * ) Notice: Subject to any disclaimer, the term of this patent is extended or adjusted under 35 U.S.C. 154(b) by 0 days.

(21) Appl. No.: 12/634,560

(22) Filed: Dec. 9, 2009

(65) Prior Publication Data

US 2010/0259796 A1 Oct. 14, 2010

Related U.S. Application Data

(62) Division of application No. 11/451,380, filed on Jun. 13, 2006, now Pat. No. 7,738,732.

(30) Foreign Application Priority Data

Jun. 28, 2005 (JP) ................................ 2005-187559

(51) Int. Cl.
*G06K 9/32* (2006.01)

(52) U.S. Cl. ........ 382/284; 382/282; 382/294; 358/537; 358/540

(58) Field of Classification Search .................. 382/282, 382/284, 291, 294; 358/537, 540
See application file for complete search history.

(56) References Cited

U.S. PATENT DOCUMENTS

| 5,157,743 | A | 10/1992 | Maeda et al. |
| 5,162,923 | A | 11/1992 | Yoshida et al. |
| 5,341,441 | A | 8/1994 | Maeda et al. |
| 5,384,868 | A | 1/1995 | Maeda et al. |
| 5,659,636 | A | 8/1997 | Maeda et al. |
| 5,696,365 | A | 12/1997 | Ukai et al. |
| 5,721,791 | A | 2/1998 | Maeda et al. |
| 5,734,915 | A | 3/1998 | Roewer |
| 5,841,898 | A | 11/1998 | Liguori et al. |
| 6,072,910 | A | 6/2000 | Maeda et al. |
| 6,537,268 | B1 | 3/2003 | Gibson et al. |
| 6,640,145 | B2 | 10/2003 | Hoffberg et al. |
| 6,738,152 | B1 * | 5/2004 | Roth et al. .................... 358/1.14 |
| 6,768,811 | B2 | 7/2004 | Dinstein et al. |
| 6,850,252 | B1 * | 2/2005 | Hoffberg ...................... 715/716 |
| 6,873,435 | B1 | 3/2005 | Tehranchi et al. |
| 6,948,070 | B1 * | 9/2005 | Ginter et al. ................... 713/193 |
| 6,957,186 | B1 * | 10/2005 | Guheen et al. ................ 705/323 |
| 7,133,845 | B1 * | 11/2006 | Ginter et al. ..................... 705/51 |
| 7,154,621 | B2 * | 12/2006 | Rodriguez et al. ............ 358/1.15 |
| 7,222,133 | B1 * | 5/2007 | Raipurkar et al. ............. 707/642 |
| 7,234,645 | B2 * | 6/2007 | Silverbrook et al. ......... 235/494 |
| 7,308,550 | B2 * | 12/2007 | Cornett ......................... 711/170 |
| 2004/0199862 | A1 | 10/2004 | Kobayashi et al. |
| 2005/0213174 | A1 | 9/2005 | Maki et al. |

FOREIGN PATENT DOCUMENTS

JP 9139832 5/1997

(Continued)

*Primary Examiner* — Yosef Kassa
(74) *Attorney, Agent, or Firm* — Fitzpatrick, Cella, Harper & Scinto (57) ABSTRACT

It is intended to provide an image composition apparatus, a control method and program of an image processing apparatus which, when a user wants to combine a photo image and a handwritten image, even if the image processing apparatus is used for other purposes or even if the power of the image processing apparatus is turned off while the user is creating the handwritten image, enables the user to subsequently resume the image composition work.

16 Claims, 5 Drawing Sheets

FOREIGN PATENT DOCUMENTS

| | | |
|---|---|---|
| JP | 10-260482 | 9/1998 |
| JP | 08287238 | 11/1998 |
| JP | 11-103387 | 4/1999 |
| JP | 2002-166604 | 6/2002 |
| JP | 2002-204412 | 7/2002 |
| JP | 2004233409 | 8/2004 |

* cited by examiner

IMAGE PROCESSING APPARATUS, AND CONTROL METHOD AND PROGRAM OF THE SAME

This application is a divisional of application Ser. No. 11/451,380, now allowed, the contents of which are incorporated by reference herein.

BACKGROUND OF THE INVENTION

1. Field of the Invention

The present invention relates to an image processing apparatus, and control method and program of the image processing apparatus.

2. Related Background Art

In recent years, as photo image input devices such as digital cameras or color scanners and image output devices such as color printers become increasingly popular and sophisticated, a variety of ways of using digital photo images have been proposed. Pictures are often not only simply printed on a recording sheet of paper as they are taken, but used after being processed and edited in many ways. The proposed usages include, for example, writing a message in a photo image and sending it as a letter, or writing a title or an illustration in a photo image and fixing it in an album.

For example, Japanese Patent Application Laid-Open No. H09-139832 proposes a method in which, if a user wants to add a message or an illustration by hand to a photo image input from an image input device, the user writes the message or the illustration by hand on a separate sheet of paper from the input photo image, and the handwritten image is read by a reading apparatus and combined with the photo image.

In doing such image composition, there is a desire to further edit a photo image in various ways, for example, by executing a trimming process to cut out part of the photo image, by executing a correction process to the photo image, or by adding a decorative pattern such as a frame or a stamp to the photo image, and to add a message or an illustration to the edited picture by hand, instead of using the photo image as it is.

As means to fulfill the desire, a method may be employed for displaying and editing a photo image using a display unit and an operation panel provided in an image composition apparatus, and combining the resulting edited photo image with a handwritten image which is written on a separate sheet of paper and read by a reading apparatus.

In the above described example of the prior art, however, there is a problem that, if a user wants to write a message or an illustration by hand in the edited photo image so that it is positioned in the background area other than the person appearing as the subject, for example, the user cannot recognize, during the creation of a handwritten image such as a message or an illustration, in what positional relationship the handwritten image will be superimposed on the photo image if they are combined.

Furthermore, since the editing information, such as a trimming position, a correction parameter or a decorative pattern, designated by the user is required at the time when a composition process is executed after the handwritten image has been read by the reading apparatus, the editing information must be stored within the apparatus until the user creates the handwritten image and completes the reading operation. Therefore, there is another problem that the image processing apparatus cannot be used for other purposes, and neither can be turned off while the user is creating the handwritten image.

SUMMARY OF THE INVENTION

It is an object of the present invention to be able to recognize, in combining a photo image and a handwritten image, the positional relationship between the photo image and the handwritten image after they are combined, at the time of writing the handwritten image by hand on a sheet of paper.

It is another object of the present invention to provide an image processing apparatus, and control method and program of the image processing apparatus which, even if the image processing apparatus is used for other purposes or even if the power of the image processing apparatus is turned off while a user is creating a handwritten image, enables the user to subsequently resume the image composition work.

DETAILED DESCRIPTION OF THE PREFERRED EMBODIMENTS

First Embodiment

Figure 1:
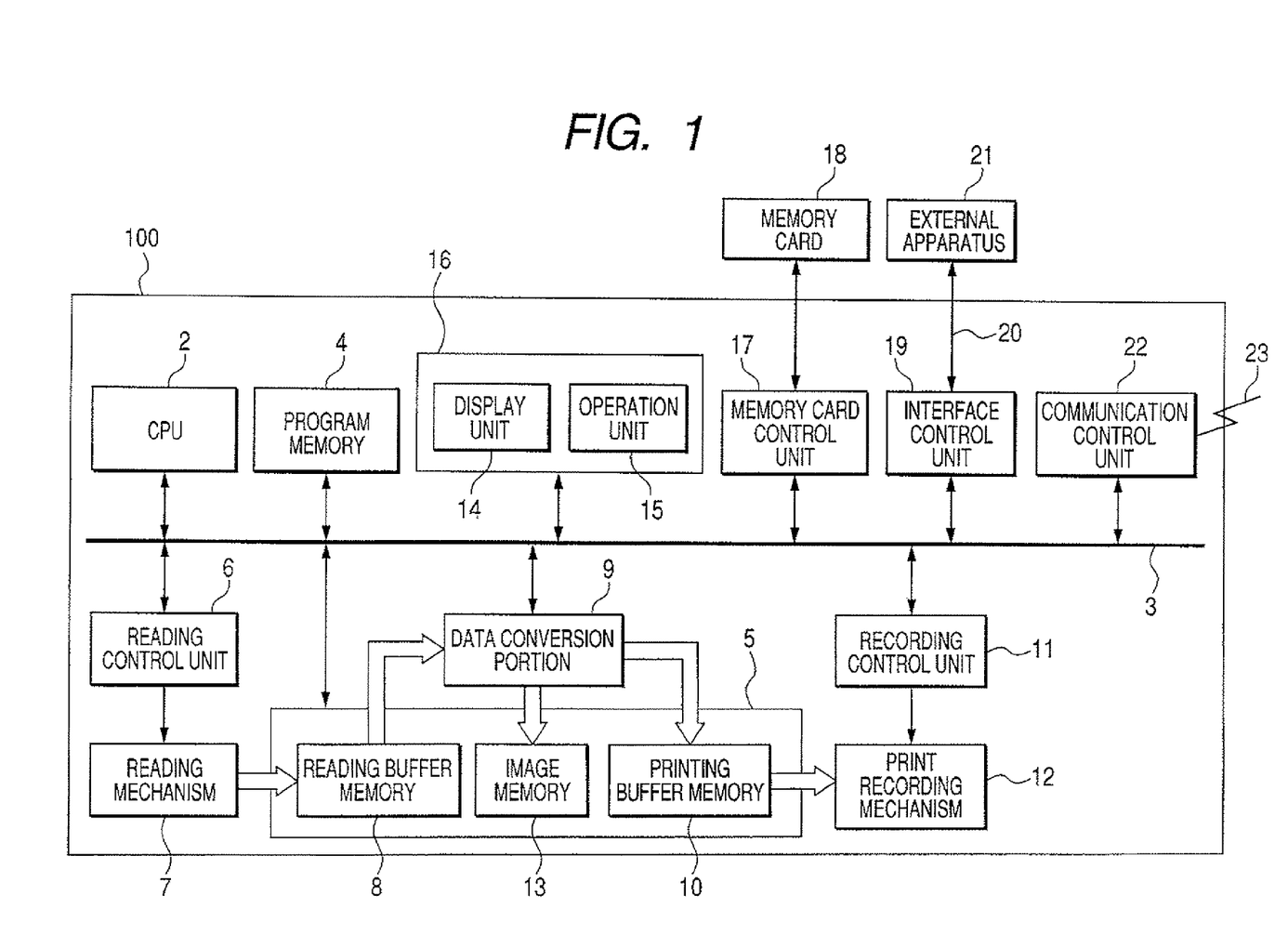
FIG. 1 is a block diagram illustrating the configuration of an image composition apparatus (image processing apparatus) 100 according to a first embodiment of the present invention.

FIG. 1 is a block diagram illustrating the configuration of an image composition apparatus (image processing apparatus) 100 according to a first embodiment of the present invention.

The image composition apparatus 100 includes a CPU 2, an internal bus 3, a program memory 4, a data memory 5, a reading control unit 6, a reading mechanism 7, a data converting unit 9, a recording control unit 11, a print recording mechanism 12, an operation panel 16, a memory card control unit 17, an interface control unit 19, an interface 20, and a communication control unit 22.

The data memory 5 includes a reading buffer memory 8, printing buffer memory 10, and an image memory 13. The operation panel 16 includes a display unit 14 and an operation unit 15.

The CPU 2 is in the form of a microprocessor, and operates according to a control program stored in the program memory 4 in the form of a ROM connected via the internal bus 3 and the content of the data memory 5 in the form of a RAM. The CPU 2 activates the reading mechanism 7 through the reading control unit 6 and stores an original image data read by an image sensor (not shown) provided in the reading mechanism 7 in the reading buffer memory 8 in the data memory 5.

The original image data stored in the reading buffer memory 8 is read out and converted into print recording data by the data converting unit 9, and then stored in the printing buffer memory 10 in the data memory 5. The CPU 2 achieves a copying operation by activating the print recording mechanism 12 through the recording control unit 11, reading out the print recording data stored in the printing buffer memory 10 and sending it to the print recording mechanism 12 to cause a print recording operation onto a recording medium to take place.

The data memory 5 is provided with the image memory 13 which allows various types of image data, in addition to the original image data read by the reading mechanism 7, to be temporarily stored and edited.

In addition to the copying operation, printing of photo images and others may also be achieved by reading out the image data stored in the image memory 13 and converting it into print recording data by the data converting unit 9 and causing a print recording operation to take place.

Note that the reading buffer memory 8, the printing buffer memory 10, and the image memory 13 on the data memory 5 are controlled by the CPU 2 to dynamically change and assign the capacity allocation among them depending on the operation status such as mode of operations or user preferences.

The image composition apparatus 100 is provided with the operation panel 16 including the display unit 14 such as an LED or LCD and the operation unit 15 of various types of keys, which can be used for various types of input operations by an operator and the indication of the operation status.

The memory card control unit 17 controls access to the memory card 18 which is a data recording medium, and reads/writes image data, etc. stored in the memory card 18. This reads out photo image data stored in the memory card 18, which is then stored in the image memory 13, converted into print recording data, and recorded by printing.

The interface control unit 19 performs the communication control of the interface 20 and transmits and receives data from/to an external apparatus 21 connected to the outside. By connecting a personal computer as the external apparatus 21, print recording data created by a printer driver running on the computer may be received and recorded by printing, or by connecting a digital camera or other devices, photo image data may be read out, stored in the image memory 13, converted into print recording data, and recorded by printing.

The communication control unit 22 is composed of a MODEM, an NCU (Network Control Unit) or the like, and connected to an analog communication line 23 to control communications and perform line control operations such as outgoing and incoming calls from/to the communication line.

Figure 2:
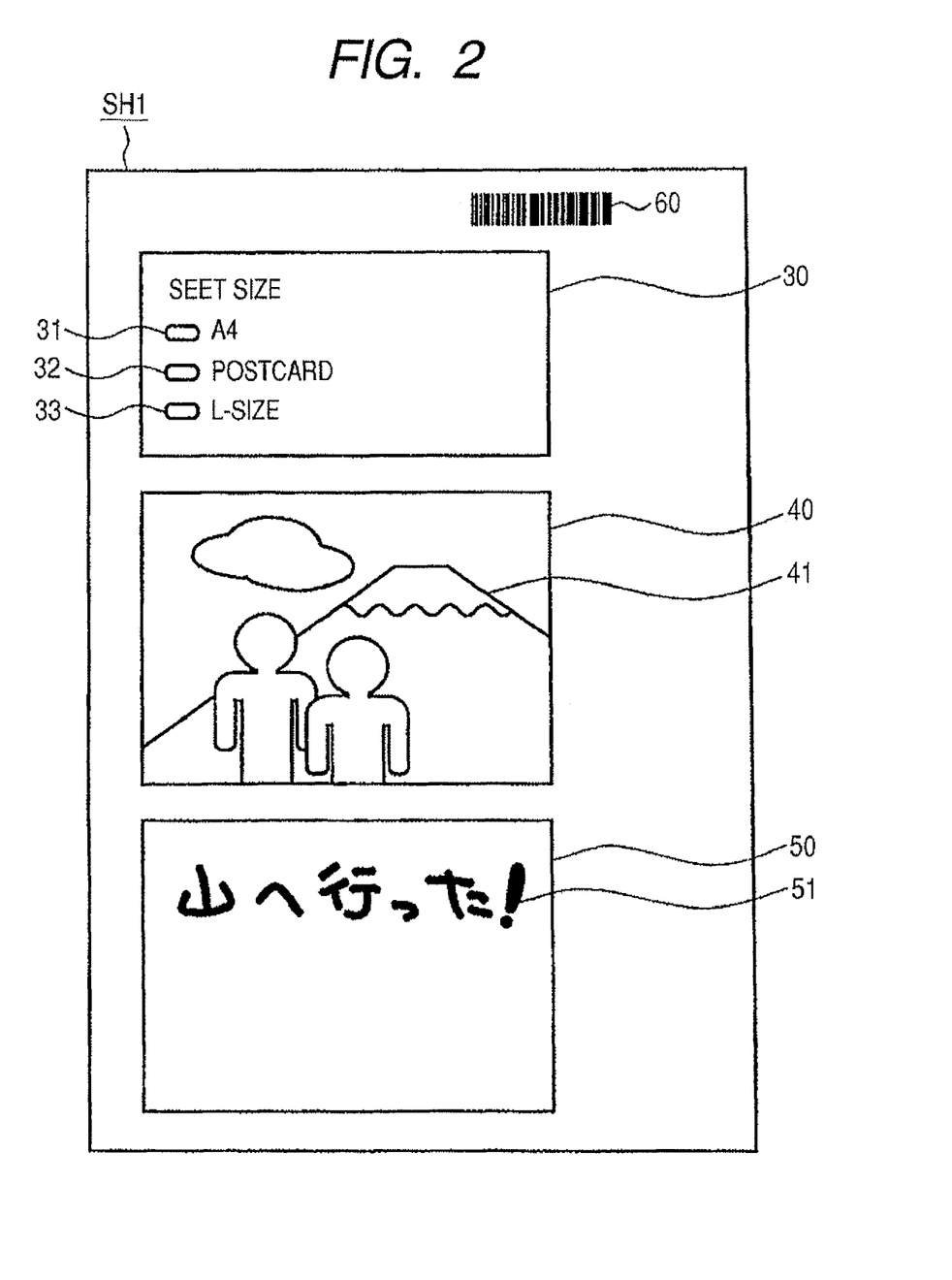
FIG. 2 shows an original sheet SH1 in the first embodiment.

FIG. 2 shows an original sheet SH1 in the first embodiment.

The original sheet SH1 includes a various settings area 30, a reference image area 40, a handwritten area 50 and a bar-code BC.

The various settings area 30 is printed at the top of the original sheet SH1 and allows a user to select settings for composition result printing by filling in a mark 31, 32 or 33 provided here. In other words, marks for sheet size selection 31, 32, and 33 are provided within the various settings area 30 on the original sheet SH1, and the user can select a sheet size of a recording medium on which the composition result is printed by filling an appropriate mark.

The reference image area 40 is provided under the various settings area 30 on the original sheet SH1 to print a reference image 41. The reference image 41 is an image corresponding to a photo image PI selected by the user. The reference image 41 is also an image representing the result of the same trimming process and the frame composition as applied to the final output form (FIG. 5) of the corresponding photo image PI.

The handwritten area 50 is provided under the reference image area 40 on the original sheet SH1 and is the same size as the reference image area 40, and the user can write a handwritten image 51 in this handwritten area 50 using any writing instrument.

The bar-code BC is also provided on the original sheet SH1, in which image identification information, such as an image number and an image file name for identifying the photo image PI selected by the user, is embedded and printed as data. In the bar-code BC, image editing information designated by the user is also embedded and printed as additional information. The reading mechanism 7 of the image composition apparatus 100 obtains the data embedded in the bar-code BC by reading the bar-code BC and analyzing the read image.

Figure 3:
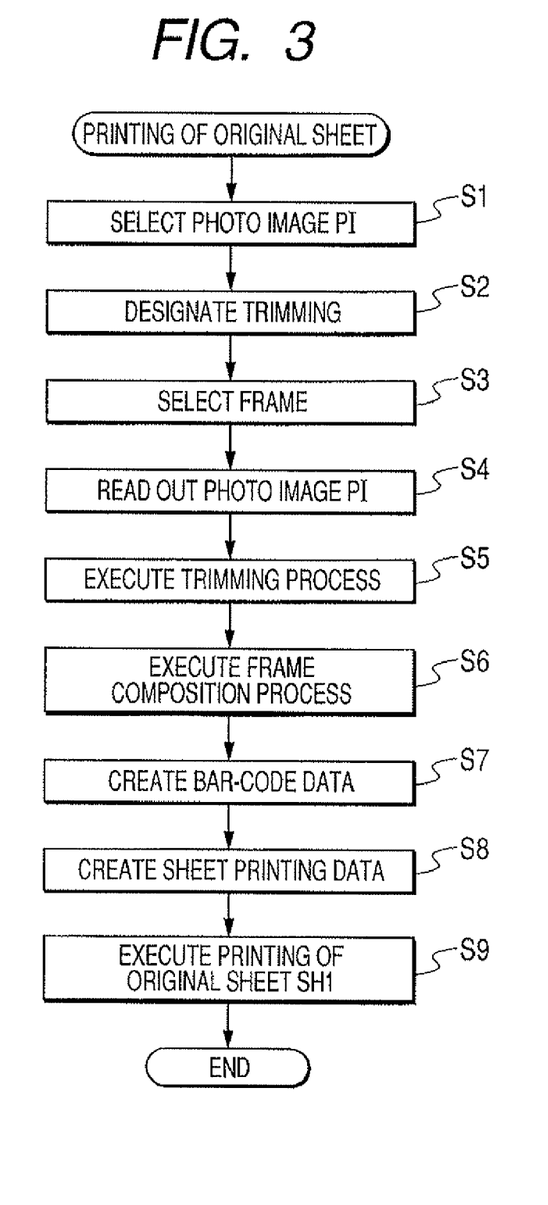
FIG. 3 is a flow chart illustrating processing operations executed by a CPU 2 of the image composition apparatus 100 in printing the original sheet SH1 in the first embodiment.

FIG. 3 is a flow chart illustrating processing operations executed by the CPU 2 of the image composition apparatus 100 in printing the original sheet SH1 in the first embodiment.

This processing is executed if a user selects "printing of original sheet" while viewing a menu displayed on the operation panel 16 by operating the operation panel 16.

First, the CPU 2, in S1, allows the user to select one of the photo images PI stored in the memory card 18. In this case, the photo image PI may be selected by displaying the photo images PI stored in the memory card 18 in turn on the display unit 14 and monitoring the key operation in the operation unit 15.

Then, in S2, the CPU 2 allows the user to designate trimming for cutting out part of the photo image PI selected in S1. In this case, the trimming may be designated by, for example, using the operation panel 16 to designate the top left and the bottom right corners of a rectangle for trimming.

In S3, the CPU 2 allows the user to select one of a plurality of frames from frame data. The frame data is a kind of image file stored previously in the program memory 4 in a predetermined format and includes decorative frame-like patterns like, and the decorative frame-like pattern can be added to the photo image by superimposing the decorative frame-like pattern on the photo image PI.

After getting the photo image PI, the trimming and the frame information designated in the above processes S1 to S3, the CPU 2 allows the user to start printing of the original sheet SH1 in S4. The CPU 2 reads out the photo image PI selected in S1 from the memory card 18 (S4), executes the trimming process based on the trimming information set in S2 (S5), reads out the frame data designated in S3 from the program memory 4 and combines the frame data with the result of S5, and obtains the reference image 40 data (S6).

In S7, the CPU 2 creates bar-code BC data based on the image identification information designated in S1, the trimming information set in S2, and the frame information designated in S3.

In S8, the CPU 2 combines the reference image 40 obtained in S4 to S6, the bar-code BC data obtained in S7, and data for printing various settings area 30 previously stored in the program memory 4 to create printing data of the original sheet SH1. The original sheet SH1 is printed by controlling the print recording mechanism 12 based on this created printing data (S9).

Figure 4:
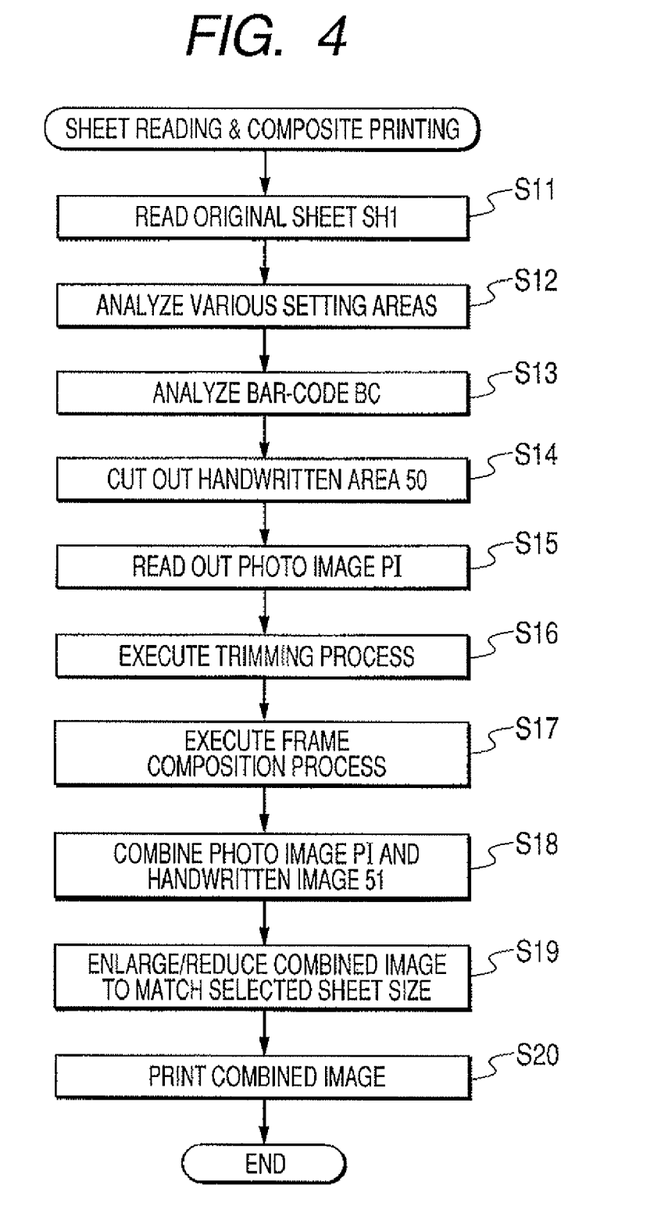
FIG. 4 is a flow chart illustrating processing operations of the CPU 2 for reading a filled original sheet SH1, combining a photo image PI and a handwritten image 51, and printing the combined image in the first embodiment.

FIG. 4 is a flow chart illustrating the processing operations of the CPU 2 for reading the filled original sheet SH1, combining the photo image PI and the handwritten image 51, and printing the combined image in the first embodiment.

This processing is executed if the user selects "original sheet reading-composite printing" in the menu displayed on the operation panel 16.

The image composition apparatus 100 controls the reading mechanism 7 to read the original sheet SH1 and yield the image data of the original sheet SH1 in S11. The selection information of the sheet size is obtained by cutting out the various settings area 30 from the read image data of the original sheet SH1 and analyzing which of the marks 31, 32 and 33 is filled in (S12).

In S13, the CPU 2 obtains the image identification information, the frame information and the trimming information by cutting out the bar-code BC part from the image data of the read original sheet SH1 and analyzing the bar-code BC data.

In S14, the CPU 2 cuts out the image of the handwritten area 50 from the image data of the original sheet SH1 read in S11 to yield the data of the handwritten image. In S15, the CPU 2 reads out a photo image PI identical to the photo image selected by the user in S1 from the memory card 18 based on the image identification information obtained by analyzing the bar-code BC data in S13.

In S16, the CPU 2 applies the trimming process to the photo image PI obtained in S15 based on the trimming information obtained in S13 by analyzing the bar-code BC data.

In S17, the CPU 2 reads out the frame data from the program memory 4 based on the frame information obtained by analyzing the bar-code BC data and superimposes the frame data on the trimmed photo image PI obtained in S16.

In S18, the CPU 2 combines the handwritten image data cut out in S14 and the edited photo image PI data obtained in S17 to produce combined image data. In S19, the CPU enlarges/reduces the combined image data based on the sheet size selection information obtained in S12, and in S20, prints the combined image on a sheet of paper by controlling the print recording mechanism 12.

Figure 5:
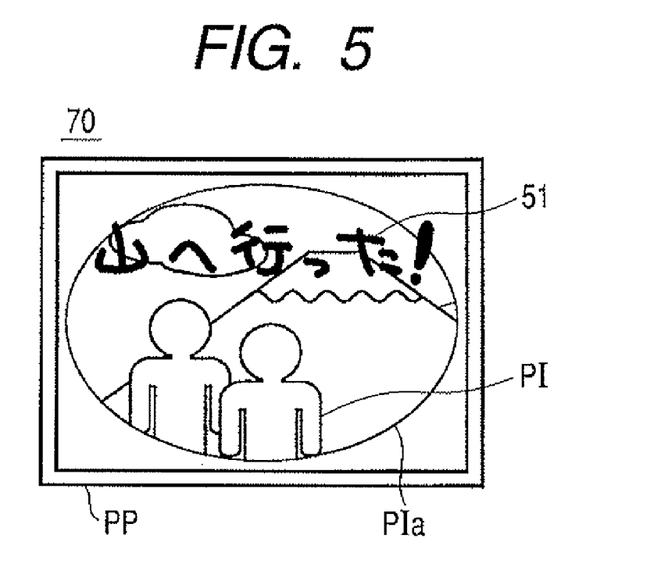
FIG. 5 shows an example composition result output 70 in the first embodiment.

FIG. 5 shows an example composition result output 70 in the first embodiment.

As shown in FIG. 5, the handwritten image 51 written in the handwritten area 50 is superimposed upon the edited photo image PIa resulting from the image editing process on the photo image PI, and the combined image is enlarged/reduced to match the selected sheet size from the sheet size selection marks 31, 32, and 33 in the various settings area 30, and the enlarged/reduced image is output onto a recording medium PP.

According to the first embodiment, since the user can view the reference image 41 resulting from the same trimming process and the frame composition as applied to the final output form of the photo image when the user writes the handwritten image 51 in the handwritten area 50 of the original sheet SH1, the user can write the handwritten image 51 with recognizing the positional relationship when it is superimposed on the photo image.

Also, according to the first embodiment, since the image identification information identifying the photo image PI selected by the user and additional information is recorded on the original sheet SH1 as a bar-code BC and do not need to be stored within the image composition apparatus 100, the image composition apparatus 100 can be used for other purposes while the user is creating a handwritten image 51, and the image composition work can be subsequently resumed even if the image composition apparatus 100 is turned off.

Second Embodiment

Although the first embodiment uses the trimming information and the frame information as the additional information, only one of the trimming information and the frame information may also be used as the additional information. This has the same advantage as in the first embodiment.

Image correction parameters for changing the lightness, color tone, etc. of the photo image PI may also be used as the additional information.

Although in the first embodiment, the print recording mechanism 12 records the result of the composition in the recording medium PP by printing, the result of the composition may also be displayed on the display unit 14 of the operation panel 16 so that the user can view it. The result of the composition may also be written and saved in a recording medium such as the memory card 18. Further, the above described result of the composition may also be transferred through the communication line 23 or the interface 20 to other devices. This has the same advantage as in the first embodiment. In this case, the resulting combined image may be edited in the other devices as described above.

Note that the above described embodiments may also be considered as an invention of a program. In other words, the above described embodiments are an example of a program that causes an image processing apparatus to execute an original sheet printing procedure of printing an original sheet containing a reference image area in which a reference image is printed, a handwritten area in which a handwritten image to be combined with a photo image corresponding to the reference image is written by hand by a user, and a bar-code in which image identification information identifying the photo image or additional information associated with the photo image is written, a handwritten image reading procedure of reading the handwritten image written in the handwritten area and outputting the data of the handwritten image, a bar-code reading procedure of reading and analyzing the bar-code and outputting the image identification information identifying the photo image or the additional information associated with the photo image, and a combining procedure of combining the photo image data detected based on the image identification information written in the bar-code and the handwritten image data output in the handwritten image reading procedure.

According to the present invention, since image identification information identifying a photo image and associated additional information is converted into a bar-code and placed and printed on an original sheet, and the image editing process may be applied to the photo image based on the image identification information and the additional information embedded in the bar-code at the time when the original sheet is read by the reading means and the composition process takes place after the user has written a handwritten image by hand in the handwritten image area of the original sheet, there is an advantage that the result of the image editing designation such as image correction or trimming made by the user before the printing of the original sheet can be reflected as is at the time of the composition process.

Furthermore, according to the present invention, since, when a photo image input from the image input means is placed and printed as a reference image on the original sheet, the result of editing the photo image based on the same additional information as the additional information embedded in the bar-code is printed as the reference image, and a user can make reference to the result of the image editing process such as image correction or trimming at the time of writing a handwritten image on the handwritten image area of the original sheet, there is an advantage that the user can write the handwritten image on the original sheet with visually recognizing the finished image.

This application claims priority from Japanese Patent Application No. 2005-187559 filed Jun. 28, 2005, which is hereby incorporated by reference herein.

What is claimed is:

1. An image processing apparatus comprising:
   a print control unit configured to cause a printing apparatus to print an original sheet containing a code which indicates an image which has been selected by a user and is stored in a memory;
   an acquiring unit configured to acquire an image of the original sheet which is read by a reading apparatus;

an analyzing unit configured to analyze the code included in the image of the original sheet acquired by the acquiring unit; and a combining unit configured to combine the selected image specified from the memory by the code analyzed by the analyzing unit and an image included in the image of the original sheet acquired by the acquiring unit.

2. The image processing apparatus according to claim 1, wherein the code further includes additional information associated with the image which has been selected by the user and is stored in the memory.

3. The image processing apparatus according to claim 2, wherein the additional information is a decorative pattern type selected by a user to add to the image which has been selected by the user and is stored in the memory.

4. The image processing apparatus according to claim 2, wherein the additional information is parameters associated with image processing designated to the image which has been selected by the user and is stored in the memory.

5. The image processing apparatus according to claim 2, wherein the additional information is trimming information indicating a region to be trimmed of the image which has been selected by the user and is stored in the memory.

6. The image processing apparatus according to claim 1, wherein the original sheet further contains a reference image area in which the image having been selected by the user is printed.

7. The image processing apparatus according to claim 6, wherein the code further includes additional information associated with the image which has been selected by the user and is stored in the memory, and wherein the reference image is an image resulting from editing the image which has been selected by the user and is stored in the memory by the user based on the additional information.

8. A image processing method comprising:
   causing a printing apparatus to print an original sheet containing a code which indicates an image which has been selected by a user and is stored in a memory;
   acquiring an image of the original sheet which is read by a reading apparatus; analyzing the code included in the acquired image of the original sheet; and
   combining the selected image specified from the memory by the analyzed code and an image included in the acquired image of the original sheet.

9. A non-transitory computer-readable storage medium storing a computer-executable program for causing an image processing apparatus to execute an image processing method, the image processing method comprising:
   causing a printing apparatus to print an original sheet containing a code which indicates an image which has been selected by a user and is stored in a memory;
   acquiring an image of the original sheet which is read by a reading apparatus; analyzing the code included in the acquired image of the original sheet; and
   combining the selected image specified from the memory by the analyzed code and an image included in the acquired image of the original sheet.

10. An original sheet containing:
    an area in which an image is to be written by a user, to be combined with an image which has been selected by a user and is stored in a memory; and
    a code which indicates the image which has been selected by the user and is stored in the memory.

11. The original sheet according to claim 10, wherein the code further includes additional information associated with the image which has been selected by the user and is stored in the memory.

12. The original sheet according to claim 11, wherein the additional information is a decorative pattern type selected by a user to add to the image which has been selected by the user and is stored in the memory.

13. The original sheet according to claim 11, wherein the additional information is parameters associated with image processing designated to the image which has been selected by the user and is stored in the memory.

14. The original sheet according to claim 11, wherein the additional information is trimming information indicating a region to be trimmed of the image which has been selected by the user and is stored in the memory.

15. The original sheet according to claim 10, wherein the image which has been selected by the user and is stored in the memory is printed as a reference image.

16. The original sheet according to claim 15, wherein the code identifies additional information associated with the image which has been selected by the user and is stored in the memory, and the reference image is an image resulting from editing the image which has been selected by the user and is stored in the memory, based on the additional information.

* * * * *